(12) United States Patent
Seo et al.

(10) Patent No.: US 10,174,193 B2
(45) Date of Patent: Jan. 8, 2019

(54) METHOD FOR PREPARING MODIFIED ACRYLONITRILE-BUTADIENE-STYRENE RESIN, AND MODIFIED ACRYLONITRILE-BUTADIENE-STYRENE RESIN PREPARED THEREBY

(71) Applicant: LG CHEM, LTD., Seoul (KR)

(72) Inventors: Jae Bum Seo, Daejeon (KR); Chang Hun Han, Daejeon (KR); Dae Woo Lee, Daejeon (KR); Jung Tae Park, Daejeon (KR); Eun Jung Choi, Daejeon (KR); Byoung Il Kang, Daejeon (KR); Da Eun Sung, Daejeon (KR); Gyu Sun Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 86 days.

(21) Appl. No.: 15/508,472

(22) PCT Filed: Jun. 17, 2016

(86) PCT No.: PCT/KR2016/006472
§ 371 (c)(1),
(2) Date: Mar. 2, 2017

(87) PCT Pub. No.: WO2016/204566
PCT Pub. Date: Dec. 22, 2016

(65) Prior Publication Data
US 2017/0275452 A1    Sep. 28, 2017

(30) Foreign Application Priority Data
Jun. 19, 2015 (KR) .................. 10-2015-0087642

(51) Int. Cl.
C08L 25/10    (2006.01)
C08L 55/02    (2006.01)
(Continued)

(52) U.S. Cl.
CPC .............. *C08L 55/02* (2013.01); *C08F 2/001* (2013.01); *C08F 2/02* (2013.01); *C08F 2/06* (2013.01); *C08F 279/02* (2013.01); *C08L 25/10* (2013.01)

(58) Field of Classification Search
None
See application file for complete search history.

(56) References Cited

U.S. PATENT DOCUMENTS 3,652,726 A    3/1972  Nield et al.
4,485,215 A *  11/1984 Dean .................. C08F 255/02
                                                        525/193

(Continued)

FOREIGN PATENT DOCUMENTS

CN    102443110 A       5/2012
KR    10-2005-0102633 A  10/2005
(Continued)

OTHER PUBLICATIONS

Extended European Search Report of Application No. 16811979.0, dated Jul. 3, 2017.
(Continued)

*Primary Examiner* — Robert S Loewe

(57) ABSTRACT

The present invention relates to method for preparing a modified acrylonitrile-butadiene-styrene resin having excellent matteness, impact resistance, and heat resistance, as well as having a low total volatile organic compounds content, and to a modified acrylonitrile-butadiene-styrene resin prepared thereby.

18 Claims, 1 Drawing Sheet

(51) Int. Cl.
    *C08F 2/02*     (2006.01)
    *C08F 2/06*     (2006.01)
    *C08F 279/02*     (2006.01)
    *C08F 2/00*     (2006.01)

(56) References Cited

U.S. PATENT DOCUMENTS

| | | | | |
|---|---|---|---|---|
| 4,587,294 | A * | 5/1986 | Matsubara | C08F 279/04 |
| | | | | 525/315 |
| 4,808,661 | A | 2/1989 | Iwamoto et al. | |
| 5,091,470 | A * | 2/1992 | Wolsink | C08L 51/04 |
| | | | | 525/282 |
| 5,191,023 | A * | 3/1993 | Iwamoto | C08F 287/00 |
| | | | | 525/282 |
| 5,412,036 | A | 5/1995 | Traugott et al. | |
| 5,446,103 | A | 8/1995 | Traugott et al. | |
| 5,506,304 | A * | 4/1996 | Otsuzuki | C08F 279/02 |
| | | | | 525/53 |
| 5,708,082 | A * | 1/1998 | Huang | C08F 265/04 |
| | | | | 525/281 |
| 5,756,579 | A * | 5/1998 | Fornasari | C08F 279/02 |
| | | | | 525/316 |
| 5,798,414 | A * | 8/1998 | Mishima | C08L 25/02 |
| | | | | 525/70 |
| 6,380,304 | B1 * | 4/2002 | Vanspeybroeck | C08L 25/12 |
| | | | | 525/70 |
| 7,312,277 | B2 * | 12/2007 | Maes | C08F 279/02 |
| | | | | 428/36.8 |
| 2006/0122331 | A1 | 6/2006 | Vanspeybroeck et al. | |
| 2011/0040035 | A1 | 2/2011 | Shields et al. | |
| 2011/0117305 | A1 | 5/2011 | Maes et al. | |

FOREIGN PATENT DOCUMENTS

| | | |
|---|---|---|
| KR | 10-2008-0035327 A | 4/2008 |
| KR | 10-2008-0058379 A | 6/2008 |
| KR | 10-2011-0041516 A | 4/2011 |

OTHER PUBLICATIONS

International Search Report for PCT/KR2016/006472 dated Jun. 17, 2016.

* cited by examiner

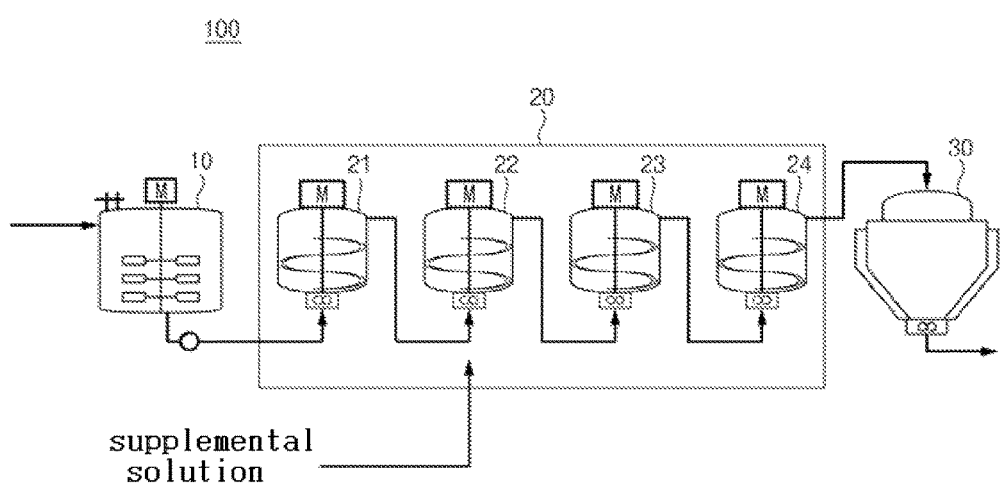

METHOD FOR PREPARING MODIFIED ACRYLONITRILE-BUTADIENE-STYRENE RESIN, AND MODIFIED ACRYLONITRILE-BUTADIENE-STYRENE RESIN PREPARED THEREBY

CROSS-REFERENCE TO RELATED APPLICATION

This application is a U.S. National Stage of International Patent Application No. PCT/KR2016/006472, filed Jun. 17, 2016, which claims the benefit of Korean Patent Application No. 10-2015-0087642, filed on Jun. 19, 2015, the entire disclosures of which are hereby incorporated by reference.

TECHNICAL FIELD

The present invention relates to method for preparing a modified acrylonitrile-butadiene-styrene resin having excellent matteness, impact resistance, and heat resistance, as well as having a low content of volatile organic compounds, and to a modified acrylonitrile-butadiene-styrene resin prepared thereby.

BACKGROUND ART

Recently, as it has become necessary to reduce the weight of automobiles, and the use of large and complex electrical and electronic devices has increased, there has appeared a need to develop thermoplastic resins having the requisite physical properties, such as heat resistance and impact resistance. In particular, in applications such as automobile interior materials, and information technology components such the cases of computers and other electronic devices, there is a preference for matte or low-gloss properties, not only for reasons of external appearance, but also to enable the elimination of expensive coating or painting operations. Moreover, recently, there has been increased interest in environmentally friendly materials. Accordingly, the need for developing materials that meet such needs has increased.

Typically, propylene resins are widely used as automobile interior materials. Such propylene resins are known for being less glossy than some thermoplastic resins. However, such propylene resins are deficient in terms of properties such as rigidity and scratch resistance. Although methods have been proposed for adding fillers and other additives to make up for such deficient properties, such properties are still deficient and thus limit the use of the propylene materials as automobile interior materials.

Moreover, resins, such as high impact polystyrene resins prepared by mixing polybutadiene and polystyrene, which exhibit matteness due to the addition a matting agent have been developed. However, as in the case of the propylene resins, there is a limitation in that a balance between the properties, such as matteness, heat resistance, and impact resistance, required by automobile interior materials is not achieved.

Meanwhile, acrylonitrile-butadiene-styrene (hereinafter, ABS) resins, methylmethacrylate-butadiene-styrene (hereinafter, MBS) resins, acrylate-styrene-acrylonitrile (hereinafter, ASA) resins, acrylic impact modifier (AIM) resins, and the like prepared through emulsion polymerization are excellent in terms of physical properties such as impact resistance, rigidity, and flowability and the like, and thus are widely used as modifiers for various plastics.

In particular, the ABS resins have excellent dimensional stability, processability, and chemical resistance, and thus are widely used as materials of monitor housings, game console housings, home appliances, office equipment, and automobile lamp housings and the like. Recently, much research is being carried out on using such ABS resins, having excellent impact resistance, chemical resistance, and processability, as automobile interior materials by imparting the ABS resins with heat resistance and matteness.

For example, a method for improving such ABS resins by preparing the ABS resins as rubber particles having large diameters of at least 1 μm has been proposed, but resins prepared using the method have an insignificant matteness effect, and have limitations of poor impact strength and heat resistance. Another method for improving such ABS resins by inserting matter fillers having a particle size of at least 5 μm has been proposed, but the prepared resins, while exhibiting excellent processability, are insufficiently matte, and have a limitation in that degradation of the impact strength is particularly severe. Moreover, a matte filler is added to impart matteness, but since a large amount is required for matteness to be imparted, impact strength is consequently degraded, and there limitations such as increased production cost.

In addition, the ABS resin prepared through emulsion polymerization has a high content of volatile organic compounds (VOC), and thus has a limitation of being difficult to adopt as an environmentally friendly material.

Meanwhile, recently, the use of ABS resins, which are prepared through bulk polymerization, bulk-solution polymerization, or bulk-suspension polymerization by using maleimide compounds as additional monomers, as materials requiring heat resistance and matteness has been proposed.

For example, U.S. Pat. No. 4,808,661 discloses an ABS resin composition prepared through a continuous bulk polymerization method in which a maleimide compound is introduced over several different points in time during a polymerization process. U.S. Pat. No. 5,091,470 indicates that an ABS resin having excellent heat resistance, impact resistance, and matteness may be prepared by introducing a maleimide compound over several different points in time during a polymerization process such that a portion is introduced after phase inversion has occurred. Moreover, U.S. Pat. No. 5,412,036 indicates that an ABS resin having increased impact resistance may be prepared through a continuous bulk polymerization method in which a maleimide compound is introduced over several different points in time, wherein the conversion rate is different at each point in time. However, such methods have the inconvenience of requiring a maleimide compound to be introduced over several different points in time, and introducing the maleimide compound over several different points in time may cause the stability of the maleimide compound in the reactor to degrade such that the maleimide compound is phase separated from other components. Moreover, there is a limitation in which the size of rubber particles formed in the ultimately prepared ABS resin is non-uniform.

Therefore, there is a need for developing a resin having matteness, excellent mechanical/chemical properties, such as impact resistance and heat resistance, and also having a low content of volatile oraganic compounds.

DISCLOSURE OF THE INVENTION

Technical Problem

In order to address the foregoing limitations, an object of the present invention is to provide a method for preparing a modified acrylonitrile-butadiene-styrene resin having excellent matteness, impact resistance, and heat resistance, and also having a low content of volatile organic compounds.

Another object of the present invention is to provide a modified acrylonitrile-butadiene-styrene resin prepared by the preparation method.

Technical Solution

To achieve the objects, the present invention provides a method for preparing a modified acrylonitrile-butadiene-styrene resin, wherein the method includes a step for preparing a polymerization solution by introducing and thereby dissolving a rubbery polymer and an N-sumstituted maleimide compound into a mixed solution that includes a reaction solvent, an aromatic vinyl monomer, and an ethylenically unsaturated nitrile monomer (first step); a step for preparing a polymerization product by polymerizing the polymerization solution (second step); and a step for devolatilizing the polymerization product (third step), wherein the rubbery polymer includes butadiene rubber and styrene-butadiene rubber.

In addition, a modified acrylonitrile-butadiene-styrene resin prepared by the preparation method is provided.

Advantageous Effects

In a method for preparing a modified ABS resin according to an embodiment of the present invention, the polymerization time of a first polymerization step, devolatilization conditions, and the ratio between rubbery polymers contained in a polymerization solution may be adjusted to prepare a modified ABS resin having excellent matteness, heat resistance, and impact resistance, and also having a low content of volatile organic compounds.

BRIEF DESCRIPTION OF THE DRAWINGS

The following drawings are included in order to provide exemplary embodiments of the present invention and, together with the description, provide a better understanding of the technical features of the present invention. The scope of the present invention should not be construed as being limited to the features which are illustrated in the drawings.

FIG. 1 exemplarily illustrates a process system in which a method for preparing a modified ABS resin according to an embodiment of the present invention may be carried out.

MODE FOR CARRYING OUT THE INVENTION

Hereinafter, the present invention is described in greater detail to provide a better understanding of the present invention.

The terms used in the present disclosure and the claims should not be construed as being limited to their typical or dictionary definitions. Rather, the terms should be construed as being appropriately defined by the inventors in order to best describe the technical concepts of the present invention.

Hereinafter, the term "continuous phase (matrix)" used in the present invention refers to a phase which, in a system having two phases mixed therein, is continuous and surrounds a dispersed phase. The term "dispersed phase" refers to a phase which, in a system having two phases mixed therein, is composed of particles disposed inside a continuous phase.

The present invention provides a method for preparing a modified acrylonitrile-butadiene-styrene (hereinafter, ABS) resin having not only excellent matteness, heat resistance, impact resistance, and processability, but also a low content of volatile organic compounds.

A method for preparing a modified ABS resin according to an embodiment of the present invention is characterized by including a step for preparing a polymerization solution by introducing and thereby dissolving a rubbery polymer and an N-sumstituted maleimide compound into a mixed solution that includes a reaction solvent, an aromatic vinyl monomer, and an ethylenically unsaturated nitrile monomer (first step); a step for preparing a polymerization product by polymerizing the polymerization solution (second step); and a step for devolatilizing the polymerization product (third step).

In addition, the rubbery polymer is characterized by including butadiene rubber and styrene-butadiene rubber.

The first step is a step for preparing a polymerization solution for a polymerization reaction, and may be performed by introducing and thereby dissolving a rubbery polymer and an N-sumstituted maleimide compound into a mixed solution that includes a reaction solvent, an aromatic vinyl monomer, and an ethylenically unsaturated nitrile monomer. The polymerization solution may include 10 to 30 wt % of the reaction solvent, 35.5 to 70.5 wt % of the aromatic vinyl monomer, 12 to 15 wt % of the ethylenically unsaturated nitrile monomer, 5 to 15 wt % of the rubbery polymer, and 2.5 to 6 wt % of the N-sumstituted maleimide compound.

Specifically, although not particularly limited thereto, the first step may be performed by introducing into a rubber dissolution tank having a temperature of at most 50° C., specifically 40 to 50° C., a reaction solvent, an aromatic vinyl monomer, and an ethylenically unsaturated nitrile monomer to prepare a mixed solution, and then introducing and thereby dissolving a rubbery polymer and an N-sumstituted maleimide compound into the mixed solution. Here, each component (for example, the reaction solvent, the aromatic vinyl monomer, the ethylenically unsaturated nitrile monomer, the rubbery polymer, and the N-sumstituted maleimide compound) may be introduced by being appropriately adjusted to be in the content range described above.

The reaction solvent may be at least one selected from the group consisting of ethylbenzene, toluene, xylene, methyl ethyl ketone, and methyl isobutyl ketone. Specifically, the reaction solvent may be ethylbenzene. As described above, the reaction solvent may be used such that the polymerization solution includes 10 to 30 wt % of the reaction solvent. When the polymerization solution includes less than 10 wt % of the reaction solvent, the viscosity of the polymerization solution may be high such that control is difficult, and when the polymerization solution includes more than 30 wt % of the reaction solvent, it may be difficult to effectively control the shape of rubber particles that form during a polymerization reaction.

The aromatic vinyl monomer may be at least one selected from the group consisting of styrene, α-methylstyrene, p-bromostyrene, p-methylstyrene, p-chlorostyrene, and o-bromostyrene, and specifically, may be styrene. As described above, the aromatic vinyl monomer may be used such that the polymerization solution includes 35.5 to 70.5 wt % of the aromatic vinyl monomer.

The ethylenically unsaturated nitrile monomer may be at least one selected from the group consisting of acrylonitrile, methacrylonitrile, ethacrylonitrile, phenylacrylonitrile, and α-chloroacrylonitrile, and specifically, may be acrylonitrile. As described above, the ethylenically unsaturated nitrile monomer may be used such that the polymerization solution includes 12 to 15 wt % of the ethylenically unsaturated nitrile monomer.

The rubbery polymer may include styrene-butadiene rubber and butadiene rubber, and have a viscosity of at most 50 cp. Specifically, the viscosity may be 10 to 50 cp.

Moreover, the rubbery polymer may include with respect to 100 parts by weight of the rubbery polymer, 30 to 50 parts by weight of butadiene rubber and 50 to 70 parts by weight of styrene-butadiene rubber. Here, the weight ratio between the butadiene rubber and the styrene-butadiene rubber included in the rubbery polymer may be 3:7 to 5:5, and specifically, may be 3:7 to 4:6. Furthermore, the viscosity of the rubbery polymer may be in the range described above.

That is, the viscosity of the rubbery polymer may change according to the content of the styrene-butadiene rubber and the butadiene rubber. When the rubbery polymer includes less than 30 parts by weight or more than 50 parts by weight of the butadiene rubber, the viscosity of the rubbery polymer may deviate from the above range, and it may be difficult to control the average particle size of rubber particles inside the modified ABS resin that is ultimately prepared. Consequently, the matteness and impact resistance of the modified ABS resin may be degraded. Here, the viscosity is measured by dissolving the rubbery polymer in styrene at a concentration of 5% and then using a Brookfield DV-type viscometer by rotating a #3 spindle at 10 rpm. The rubbery polymer used in the measurement is the one obtained by mixing styrene-butadiene rubber and butadiene rubber and the weight ratio described above.

Furthermore, as described above, the rubbery polymer is used such that the polymerization solution includes 5 to 15 wt % of the rubbery polymer. Specifically, the polymerization solution may include as the rubbery polymer, styrene-butadiene rubber and butadiene rubber, and the styrene-butadiene rubber and butadiene rubber in the polymerization solution may have the above weight ratio. For example, when the polymerization solution includes 5 wt % of the rubbery polymer (sum total of the styrene-butadiene rubber and the butadiene rubber), the polymerization solution may include 3.3 wt % of the styrene-butadiene rubber and 1.7 wt % of the butadiene rubber.

The styrene-butadiene rubber (SBR) used in the present invention indicates a copolymer prepared by polymerizing styrene monomers and diene monomers, and the butadiene rubber (BR) indicates a homopolymer of diene monomers. The styrene-butadiene rubber and butadiene rubber, according to the intended purpose, may be used after being prepared through a typical polymerization method or after being purchased commercially.

Specifically, the styrene-butadiene rubber (SBR) and the butadiene rubber (BR) may be a linear rubber prepared through solution polymerization. Moreover, an example of a commercially available styrene-butadiene rubber may be Asaprene 670A (40 wt % styrene, Asahi-Kasei), while an example of a commercially available butadiene rubber may be Asaprene 730AX (Asahi-Kasei).

The N-sumstituted maleimide compound may be at least one selected from the group consisting of n-methyl maleimide, n-ethyl maleimide, n-propyl maleimide, n-t-butyl maleimide, n-isopropyl maleimide, n-cyclohexyl maleimide, n-phenyl maleimide, n-naphthyl maleimide, and N-o-chlorophenyl maleimide, and specifically, may be n-phenyl maleimide. As described above, the N-sumstituted maleimide compound may be used such that the polymerization solution includes 2.5 to 6 wt % of the N-sumstituted maleimide compound. When the polymerization solution includes less than 2.5 wt % of the n-phenyl maleimide compound, the effect of enhancing the heat resistance of the prepared modified ABS resin may be negligible, and when the polymerization solution includes more than 6 wt % of the n-phenyl maleimide compound, although the effect of enhancing the heat resistance of the prepared modified ABS resin may be large, other physical properties, such as impact resistance, processability, matteness, etc., may be degraded.

Moreover, the polymerization solution may include with respect to 100 parts by weight of the polymerization solution, 001 to 0.04 parts by weight of a polymerization initiator, and the polymerization initiator may be introduced when introducing the rubbery polymer and the N-sumstituted maleimide compound.

The polymerization initiator may be at least one selected from the group consisting of t-butyl peroxy-2-ethylhexanoate, azobisisobutyronitrile, benzoyl peroxide, cumil peroxide, and t-butyl peroxide, 1,1-di(t-butylperoxy)cyclohexane.

The second step is a step for preparing a polymerization product by polymerizing the polymerization solution. The polymerization reaction may be performed via a continuous bulk polymerization which includes at least one polymerization step. Here, the "at least one" may indicate at minimum one, or one or more. That is, the polymerization reaction according to an embodiment of the present invention may be performed via the continuous bulk polymerization which includes at least one polymerization step, and the number of the polymerization steps may be adjusted according to the intended purpose. For example, the polymerization reaction may be performed via the continuous bulk polymerization which includes 1 to 10 polymerization steps.

Specifically, the polymerization reaction may be performed via the continuous bulk polymerization which includes a first polymerization step, a second polymerization step, a third polymerization step, and a fourth polymerization step.

Specifically, the polymerization reaction may be performed by performing, in sequence, the first polymerization step, the second polymerization step, the third polymerization step, and the fourth polymerization step, and the polymerization temperature may increase as polymerization proceeds from the first polymerization step to the fourth polymerization step. That is, the polymerization temperature of the second polymerization step may be higher than the polymerization temperature of the first polymerization step, the polymerization temperature of the third polymerization step may be higher than the polymerization temperature of the second polymerization step, and the polymerization temperature of the fourth polymerization step may be higher than the polymerization temperature of the third polymerization step.

The first polymerization step, the second polymerization step, the third polymerization step, and the fourth polymerization step may be continuous batch polymerizations performed under the respective polymerization conditions described below:

first polymerization step: polymerize at a temperature range of 100 to 120° C. for 1.5 to 2.5 hours;
second polymerization step: polymerize at a temperature range of 125 to 140° C.;
third polymerization step: polymerize at a temperature range of 140 to 150° C.; and
fourth polymerization step: polymerize at a temperature range of 150 to 160° C.

In the polymerization reaction according to an embodiment of the present invention, the content of volatile organic compounds in the modified ABS resin ultimately prepared may be reduced by polymerizing in the first polymerization step for the length of time described above. Moreover, polymerization may be performed by adjusting the polymerization conditions (temperature and time) of the first polymerization as above such that after the first polymerization step, the weight-average molecular weight of a continuous phase may be adjusted to be 250,000 to 300,000 g/mol, and since the weight-average molecular weight of the continuous phase in the modified ABS resin that is consequently prepared may be adjusted to be in the intended range, impact resistance may be enhanced. Here, the continuous phase may be a terpolymer derived from an aromatic vinyl monomer, an ethylenically unsaturated nitrile monomer, and an N-sumstituted maleimide compound.

The time in the first polymerization step may be adjusted according to the flow rate of the polymerization solution introduced into a first reactor, and may indicate the retention time of the polymerization solution in a first polymerization reactor in which the first polymerization step is carried out. Here, other than the first polymerization step, the second polymerization step, the third polymerization step, and the fourth polymerization step may respectively be carried out at the temperature conditions described above for appropriate lengths of reaction time according to intended purposes.

Moreover, in order to adjust the viscosity of the polymerization solution in the second polymerization step and adjust the weight-average molecular weight of the modified ABS resin that is ultimately prepared, a supplemental solution including, with respect to 100 parts by weight of the polymerization solution, 10 to 25 parts by weight of a reaction solvent and 0.02 to 0.04 parts by weight of a molecular weight control agent may be added and thereby made to participate in the polymerization.

The reaction solvent may be the same as or include that described above.

The molecular weight control agent may include at least one selected from the group consisting of n-dodecyl mercaptan, n-amyl mercaptan, t-butyl mercaptan, t-dodecyl mercaptan, n-hexyl mercaptan, n-octyl mercaptan, and n-nonyl mercaptan.

The third step is a step for devolatilizing the polymerization product prepared through the second step in order to remove unreacted monomers and the reaction solution from the polymerization product and obtain the intended modified ABS resin.

The devolatilization may be carried out at a temperature range of 230 to 250° C. and under a pressure condition of 30 torr or below. Specifically, the devolatilization may be carried out under a pressure condition of 10 to 30 torr. In the preparation method according to an embodiment of the present invention, the content of volatile organic compounds in the modified ABS resin that is ultimately prepared may be reduced by performing the devolatilization under the above conditions.

Hereinafter, the preparation method according to an embodiment of the present invention will be described with reference to FIG. 1.

FIG. 1 exemplarily illustrates a process system in which a preparation method according to an embodiment of the present invention may be carried out.

A process system 100 according to an embodiment of the present invention may include a rubber dissolution tank 10 in which a polymerization solution may be prepared, a polymerization tank 20 in which a polymerization reaction may be carried out, and a devolatilization tank 30 in which a devolatilization operation may be carried out, and the polymerization tank 20 may be a continuous bulk polymerization reactor including in which a first polymerization reactor 21, a second polymerization reactor 22, a third polymerization reactor 23, and a fourth polymerization reactor 24 are continuously arranged.

Specifically, the first step may be carried out in the rubber dissolution tank 10. The polymerization solution may be prepared by introducing into the rubber dissolution tank 10, a reaction solvent, an aromatic vinyl monomer, and an ethylenically unsaturated nitrile monomer to prepare a mixed solution, and then introducing and thereby completely dissolving therein a styrene-butadiene rubber, a butadiene rubber, an N-sumstituted maleimide compound, and a polymerization initiator. Here, the rubber dissolution tank 10 may include therein, an agitator.

The second step may be carried out in the polymerization tank 20 in which are continuously arranged the first polymerization reactor 21, the second polymerization reactor 22, the third polymerization reactor 23, and the fourth polymerization reactor 24. A first polymerization step may be carried out by transporting the polymerization solution from the rubber dissolution tank 10 to the first polymerization reactor 21, and polymerizing at a temperature range of 100 to 120° C. for 1.5 to 2.5 hours. Here, the polymerization solution may be transported into the first polymerization reactor 21 at a flow rate of 10 to 14 kg/hr, and by transporting at the flow rate, the retention time in the first polymerization reactor may be controlled to be 1.5 to 2.5 hours. Here, the retention time in the first polymerization reactor may indicate the polymerization time in the first polymerization reactor. A second polymerization step may be carried out by transporting to the second polymerization reactor 22, a first polymerization product which has passed through the first polymerization step, and polymerizing at a temperature range of 125 to 140° C. Here, in addition to the first polymerization product, a supplemental solution including the reaction solvent and a molecular weight control agent may be introduced in to the second polymerization reactor 22 and be polymerized along with the first polymerization product. Here, the supplemental solution may be introduced into the second polymerization reactor 22 at a flow rate of 1 to 2.5 kg/hr. Afterwards, a third polymerization step may be carried out by transporting to the third polymerization reactor 23, a second polymerization product which has passed through the second polymerization step, and polymerizing at a temperature range of 140 to 150° C., and a polymerization product may be prepared by transporting to the fourth polymerization reactor 24, a third polymerization product which has passed through the third polymerization step, and polymerizing at a temperature range of 150 to 160° C.

The third step may be carried out in the devolatilization tank 30. A modified ABS resin may be obtained by transporting the polymerization product from the fourth polymerization reactor 24 to the devolatilization tank 30, and devolatilizing at a temperature range of 230 to 250° C. under a pressure condition of 30 torr.

Furthermore, the present invention provides a modified ABS resin prepared by the preparation method.

The modified ABS resin according to an embodiment of the present invention includes a dispersed phase and a continuous phase, wherein the dispersed phase is a rubber particle derived from a rubbery polymer that includes a butadiene rubber and a styrene-butadiene rubber, and the continuous phase is a terpolymer derived from an aromatic vinyl monomer, an ethylenically unsaturated nitrile monomer, and an N-sumstituted maleimide compound. Moreover, at least a portion of the continuous phase may be grafted or adsorbed on the external surface of the dispersed phase. That is, the modified ABS resin according to an embodiment of the present invention may include rubber particles derived from a rubbery polymer including a butadiene rubber and a styrene-butadiene rubber (a dispersed phase), a terpolymer (a continuous phase) derived from an aromatic vinyl monomer, an ethylenically unsaturated nitrile monomer, and an N-sumstituted maleimide compound, and a terpolymer grafted or adsorbed on the external surface of the rubber particles (a portion of the continuous phase).

Here, the weight ratio between the dispersed phase and the continuous phase in the modified ABS resin may be 8:92 to 25:75, and the at least a portion of the continuous phase grafted or adsorbed on the external surface of the dispersed phase may be present in the resin in 30 to 60 parts by weight per 100 parts by weight of the total continuous phase.

The term "grafted", as used in the present invention, indicates a state of contact or bonding. For example, being grafted on the external surface of a dispersed phase may indicate being in contact with or bonded to the external surface of the dispersed phase.

The term "at least a portion", as used in the present invention, indicates at minimum a portion of the whole. For example, when the entirety of a continuous phase is 10 and a minimum is 1, "at least a portion" may refer to "at least one".

The weight-average molecular weight (Mw) of the continuous phase in the modified ABS resin may be 150,000 to 180,000 g/mol, and the average particle diameter of the dispersed phase in the modified ABS resin may be 1.0 to 2.0 µm. The modified ABS resin according to an embodiment of the present invention may have excellent matteness and impact resistance due to having such physical properties.

In the present invention, the weight-average molecular weight is measured as a relative value to a standard polystyrene specimen using gel permeation chromatography, after dissolving the resin to a concentration 0.25% in a tetrahydrofuran (THF) solution.

Moreover, the modified ABS resin may include 5 to 8 wt % of an N-sumstituted maleimide compound-derived unit, and may thereby have improved heat resistance. Here, the N-sumstituted maleimide compound-derived unit is included in the continuous phase in the modified ABS resin, and may make up the continuous phase.

Meanwhile, the N-sumstituted maleimide compound-derived unit is derived from the N-sumstituted maleimide compound included in the polymerization solution described above. The N-sumstituted maleimide compound, due to a difference in reactivity with other monomers (for example, aromatic vinyl monomers and ethylenically unsaturated nitrile monomers) included in the polymerization solution, is almost 100% converted into polymer, whereas the other monomers are only about 70% converted into polymer.

Moreover, the proportion of the N-sumstituted maleimide compound-derived unit in the modified ABS resin increases relative to the proportion of the N-sumstituted maleimide compound in the polymerization solution.

In the present invention, the content of the N-sumstituted maleimide compound-derived unit in the modified ABS resin is measured using an elemental analyzer (EA).

In addition, the modified ABS resin may have a total volatile organic compounds (TVOC) content of 40 µg C/g or less. Specifically, the modified ABS resin may have a TVOC content of 30 µg C/g or less.

In the present invention, the TVOC content in the modified ABS resin is measured in accordance with PV 3341. Specifically, headspace gas chromatography is used to measure volatile organic compounds collected after placing 1 g of the modified ABS resin in a 10 mL vial and leaving the modified ABS resin alone at 120° C. for 5 hours.

The modified ABS resin may have a Vicat softening point, measured in accordance with ASTM D1525, of 100 to 120° C., an impact strength, measured in accordance with ASTM D256, of 10 to 20 kgf·cm/cm$^2$, and a tensile strength, measured in accordance with ASTM D638, of 430 to 500 kgf/cm$^2$.

Specifically, in the present invention, the impact strength is measured in accordance with ASTM D256 (notched at 23° C.) by injection molding the modified ABS resin at 230° C. to prepare a ¼" specimen, the tensile strength is measured by preparing a specimen in accordance with ASTM D638 and using a universal testing machine (UTM, model name: 4466, Instron) to pull the specimen at a crosshead speed of 500 mm/min and measure the point at which the resin is cut.

By being prepared in accordance with the preparation method described above, the modified ABS resin according to an embodiment of the present invention may have the physical properties (for example, weight-average molecular weight of the continuous phase, average particle diameter of the dispersed phase, TVOC content) described above, and may also have excellent impact resistance, heat resistance, and matteness.

Hereinafter, the present invention is described in greater detail with reference to examples and experimental examples. However, the examples and experimental examples described below are for exemplifying the present invention, and the scope of the present invention is not limited thereto.

Hereinafter, the parts by weight unit used in examples and comparative examples are based on 100 parts by weight of the total amount of a polymerization solution composed of ethylene benzene, styrene, acrylonitrile, rubber (styrene-butadiene rubber, butadiene rubber, or mixtures thereof), and n-phenyl maleimide. Moreover, the styrene-butadiene rubber used is Asaprene 670A (Asahi-Kasei), while the butadiene rubber used is Asaprene 730AX (Asahi-Kasei).

Example 1

A mixed solution was prepared by introducing 20 wt % of ethylbenzene, 54.57 wt % of styrene, and 13.64 wt % of acrylonitrile into a 50° C. rubber dissolution tank. After introducing and thereby completely dissolving 4.92 wt % of styrene-butadiene rubber, 3.28 wt % of butadiene rubber, and 3.59 wt % of n-phenyl maleimide, 0.02 parts by weight of t-butyl peroxy-2-ethylhexanoate was added to prepare a polymerization solution. The prepared polymerization solution was polymerized via continuous bulk polymerization. Here, the polymerization reaction was carried out by employing an increasing temperature profile in a multistage polymerization reactor system composed of a first polymerization reactor, a second polymerization reactor, a third polymerization reactor, and a fourth polymerization reactor. Specifically, the polymerization solution was introduced into the first polymerization reactor having a capacity of 26 L, wherein the polymerization solution was introduced into the first polymerization reactor at a flow rate of 12 kg/hr such that the polymerization solution was retained in the first reactor for 2 hours. A first polymerization product polymerized in the first polymerization reactor was transported to the second polymerization reactor, and polymerization was carried out at 135° C. by introducing a supplemental solution including 10 parts by weight of ethylbenzene and 0.03 parts by weight of t-dodecyl mercaptan into the second polymerization reactor at a flow rate of 1.5 kg/hr. Afterwards, polymerization was carried out by transporting the obtained product, in sequence, to the third polymerization reactor set at 145° C. and the fourth polymerization reactor set at 150° C., to produce a polymerization product. The obtained polymerization product was transported to a devolatilization tank and a modified ABS resin was obtained in pellet form by recovering and removing unreacted monomers and reaction solvent at a temperature of 235° C. and a pressure of 25 torr.

Example 2

Other than introducing the polymerization solution into the first reactor at a flow rate of 10 kg/hr to control the retention time in the first polymerization reactor to be 2.3 hours, a modified ABS resin was obtained in pellet form through the same method as Example 1.

Example 3

Other than introducing the polymerization solution into the first reactor at a flow rate of 14 kg/hr to control the retention time in the first polymerization reactor to be 1.7 hours, a modified ABS resin was obtained in pellet form through the same method as Example 1.

Example 4

Other than using 4.1 wt % of styrene-butadiene rubber and 4.1 wt % of butadiene rubber, a modified ABS resin was obtained in pellet form through the same method as Example 1.

Example 5

Other than using 5.74 wt % of styrene-butadiene rubber and 2.46 wt % of butadiene rubber, a modified ABS resin was obtained in pellet form through the same method as Example 1.

Example 6

Other than using 53.99 wt % of styrene, 13.54 wt % of acrylonitrile, and 4.31 wt % of n-phenyl maleimide, a modified ABS resin was obtained in pellet form through the same method as Example 1.

Example 7

Other than using 52.80 wt % of styrene, 13.20 wt % of acrylonitrile, and 5.80 wt % of n-phenyl maleimide, a modified ABS resin was obtained in pellet form through the same method as Example 1.

Example 8

Other than introducing the supplemental solution including ethylbenzene and t-dodecyl mercaptan into the second polymerization reactor at a flow rate of 2.5 kg/hr, a modified ABS resin was obtained in pellet form through the same method as Example 1.

Comparative Example 1

Other than using 57.44 wt % of styrene and 14.36 wt % of acrylonitrile, and not using n-phenyl maleimide, a ABS resin was obtained in pellet form through the same method as Example 1.

Comparative Example 2

Other than not using styrene-butadiene rubber, and using 8.2 wt % of butadiene rubber, a modified ABS resin was obtained in pellet form through the same method as Example 1.

Comparative Example 3

Other than using 3.28 wt % of styrene-butadiene rubber and 4.92 wt % of butadiene rubber, a modified ABS resin was obtained in pellet form through the same method as Example 1.

Comparative Example 4

Other than using 6.56 wt % of styrene-butadiene rubber and 1.64 wt % of butadiene rubber, a modified ABS resin was obtained in pellet form through the same method as Example 1.

Comparative Example 5

Other than using 55.52 wt % of styrene, 13.88 wt % of acrylonitrile, and 2.4 wt % of n-phenyl maleimide, a modified ABS resin was obtained in pellet form through the same method as Example 1.

Comparative Example 6

Other than using 51.68 wt % of styrene, 12.92 wt % of acrylonitrile, and 7.2 wt % of n-phenyl maleimide, a modified ABS resin was obtained in pellet form through the same method as Example 1.

Comparative Example 7

Other than introducing the polymerization solution into the first polymerization reactor at a flow rate of 16 kg/hr to control the retention time in the first polymerization reactor to be 1.4 hours, a modified ABS resin was obtained in pellet form through the same method as Example 1.

Comparative Example 8

Other than introducing the polymerization solution into the first polymerization reactor at a flow rate of 8 kg/hr to control the retention time in the first polymerization reactor to be 2.9 hours, a modified ABS resin was obtained in pellet form through the same method as Example 1.

Comparative Example 9

Other than changing the temperature in the devolatilization tank to 255° C., a modified ABS resin was obtained in pellet form through the same method as Example 1.

Comparative Example 10

Other than changing the temperature in the devolatilization tank to 220° C., a modified ABS resin was obtained in pellet form through the same method as Example 1.

Comparative Example 11

Other than changing the pressure in the devolatilization tank to 35 torr, a modified ABS resin was obtained in pellet form through the same method as Example 1.

Comparative Example 12

Other than not introducing acrylonitrile and n-phenyl maleimide into the rubber dissolution tank, but instead, after separately mixing acrylonitrile and n-phenyl maleimide, introducing the same into the first polymerization reactor such that the acrylonitrile and n-phenyl maleimide participate in the polymerization, a modified ABS resin was obtained in pellet form through the same method as Example 1.

EXPERIMENTAL EXAMPLES

In order to comparatively analyze the properties of the respective resins prepared in Examples 1 to 8 and Comparative Examples 1 to 12 described above, the analyses below were carried out on each of the respective resins. The results are shown in Table 1 below.

1) n-Phenyl Maleimide Content

In order to comparatively analyze the n-phenyl maleimide content in each of the respective resins prepared in Examples 1 to 8 and Comparative Examples 1 to 12 described above, each of the respective resins was analyzed using an elemental analyzer (EA).

2) Residual Monomer Content

In order to comparatively analyze the residual monomer content in each of the respective resins prepared in Examples 1 to 8 and Comparative Examples 1 to 12 described above, each of the respective resins was analyzed using gel chromatography.

3) Measurement of Weight-Average Molecular Weight

The weight-average molecular weight of the continuous phase in each of the respective resins prepared in Examples 1 to 8 and Comparative Examples 1 to 12 described above, and the weight-average molecular weight of the continuous phase in the first polymerization product formed during the preparation of each of the respective resins were measured and comparatively analyzed.

The weight-average molecular weight of each of the respective continuous phases was measured as a relative value to a standard polystyrene specimen using gel permeation chromatography (GPC, Waters Breeze), after dissolving the respective resin or first polymerization product to a concentration of 0.25% in a tetrahydrofuran (THF) solution.

4) Measurement of Average Particle Diameter of Rubber Particles

The average particle diameters of the rubber particles (dispersed phase) in the respective resins prepared in Examples 1 to 8 and Comparative Examples 1 to 12 described above were measured and comparatively analyzed.

The average particle diameter was measured using a Coulter counter (LS230, BECKMAN COULTER) after dissolving 0.5 g of the respective resin in 100 mL of methyl ethyl ketone.

5) Measurement of Total Volatile Organic Compounds (TVOC)

The total volatile organic compounds contents in the respective resins prepared in Examples 1 to 8 and Comparative Examples 1 to 12 described above were comparatively analyzed.

The total volatile organic compounds (TVOC) contents were measured in accordance with PV 3341. Specifically, headspace gas chromatography was used to measure volatile organic compounds collected after placing 1 g of the respective modified ABS resin in a 10 mL vial and leaving the modified ABS resin alone at 120° C. for 5 hours.

6) Vicat Softening Point

In order to comparatively analyze the heat resistance of the respective resins prepared in Examples 1 to 8 and Comparative Examples 1 to 12 described above, the Vicat softening point of each of the respective resins was measured in accordance with ASTM D1525.

7) Measurement of Impact Strength

In order to comparatively analyze the impact resistance of the respective resins prepared in Examples 1 to 8 and Comparative Examples 1 to 12 described above, the impact strength of each of the respective resins was measured.

The impact strength was measured in accordance with ASTM D256 (¼", notched at 23° C.) by injection molding the respective resin at 230° C. to prepare a ¼" specimen.

8) Measurement of Melt Flow Index

In order to comparatively analyze the processability of the respective resins prepared in Examples 1 to 8 and Comparative Examples 1 to 12 described above, the melt flow index of each of the respective resins was measured.

The melt flow index of each of the respective resins was obtained in accordance with ASTM D1238 by measuring the weight (g) of resin which melts and comes out within 10 minutes at a temperature of 220° C. and a load of 10 kg.

9) Measurement of Tensile Strength

The tensile strengths of the respective resins prepared in Examples 1 to 8 and Comparative Examples 1 to 12 described above were measured.

The tensile strength was measured in accordance with ASTM D638 by using a universal testing machine (UTM, model name: 4466, Instron) to pull each of the respective resins at a crosshead speed of 500 mm/min and measure the points at which the resins were cut.

TABLE 1

| | | PMI content (wt %) | Residual monomers (ppm) | Weight-average molecular weight (Mv, kg/mol) | | Average particle diameter of rubber particles (μm) | TVOC (μg C/g) | Vicat softening point (° C.) | Impact strength (kgf · cm/cm$^2$) | Melt flow index | Tensile strength (kgf/cm$^2$) |
|---|---|---|---|---|---|---|---|---|---|---|---|
| | | | | First polymerization product | Resin | | | | | | |
| Examples | 1 | 6.2 | 630 | 283 | 172 | 1.54 | 24 | 109 | 15 | 6 | 460 |
| | 2 | 6.1 | 580 | 292 | 179 | 1.68 | 22 | 110 | 14 | 5 | 454 |
| | 3 | 6.3 | 590 | 277 | 168 | 1.36 | 26 | 108 | 16 | 7 | 467 |
| | 4 | 6.2 | 580 | 280 | 168 | 1.55 | 25 | 108 | 17 | 6 | 455 |

TABLE 1-continued

|  |  | PMI content (wt %) | Residual monomers (ppm) | Weight-average molecular weight (Mv, kg/mol) | | Average particle diameter of rubber particles (μm) | TVOC (μg C/g) | Vicat softening point (° C.) | Impact strength (kgf · cm/cm$^2$) | Melt flow index | Tensile strength (kgf/cm$^2$) |
|---|---|---|---|---|---|---|---|---|---|---|---|
|  |  |  |  | First polymerization product | Resin |  |  |  |  |  |  |
|  | 5 | 6.2 | 620 | 281 | 173 | 1.24 | 22 | 109 | 15 | 6 | 483 |
|  | 6 | 7.3 | 620 | 269 | 167 | 1.41 | 17 | 112 | 13 | 5 | 471 |
|  | 7 | 9.1 | 630 | 256 | 162 | 1.59 | 13 | 114 | 12 | 5 | 469 |
|  | 8 | 6.1 | 680 | 281 | 162 | 1.74 | 29 | 108 | 14 | 7 | 443 |
| Comparative Examples | 1 | — | 680 | 321 | 188 | 1.46 | 51 | 101 | 20 | 12 | 462 |
|  | 2 | 6.2 | 690 | 280 | 176 | 6.48 | 29 | 105 | 6.2 | 6 | 339 |
|  | 3 | 6.1 | 680 | 278 | 174 | 3.54 | 28 | 107 | 8.2 | 6 | 382 |
|  | 4 | 6.3 | 620 | 275 | 166 | 0.96 | 28 | 106 | 8 | 7 | 540 |
|  | 5 | 4.2 | 711 | 309 | 183 | 1.62 | 48 | 104 | 16 | 8 | 473 |
|  | 6 | 11.3 | 644 | 237 | 142 | 2.91 | 11 | 117 | 5 | 3 | 402 |
|  | 7 | 6.3 | 930 | 313 | 192 | 1.74 | 44 | 105 | 15 | 4 | 441 |
|  | 8 | 6 | 530 | 205 | 142 | 1.69 | 22 | 109 | 9.3 | 8 | 446 |
|  | 9 | 6.2 | 590 | 289 | 175 | 1.74 | 21 | 109 | 9.6 | 5 | 467 |
|  | 10 | 6.1 | 910 | 288 | 174 | 1.69 | 53 | 104 | 16 | 7 | 452 |
|  | 11 | 6.1 | 1010 | 278 | 169 | 1.65 | 62 | 104 | 13 | 7 | 448 |
|  | 12 | 6.3 | 639 | 316 | 182 | 3.11 | 25 | 108 | 9.2 | 4 | 390 |

As indicated in Table 1, it was observed that, compared to the ABS resin in Comparative Example 1 and the modified ABS resins in Comparative Examples 2 to 12, the modified ABS resins in Examples 1 to 8 prepared using a preparation method according to an embodiment of the present invention had a low volatile organic compounds content and overall excellent impact resistance, heat resistance, processability, and tensile strength.

Specifically, compared to the modified ABS resin in Example 1, the ABS resin in Comparative Example 1 prepared without using an N-sumstituted maleimide compound according to an embodiment of the present invention had a low Vicat softening point, an increased melt flow index, and at least a two times increase in total volatile organic compounds (TVOC).

In addition, compared to the modified ABS resins in Examples 1, 4, and 5, the modified ABS resin in Comparative Example 2, which had the same preparation method but in which, in the preparation thereof, butadiene rubber was used alone as a rubbery polymer, and the modified ABS resins in Comparative Example 3 (styrene-butadiene rubber:butadiene rubber=4:6 by weight) and Comparative Example 4 (styrene butadiene rubber:butadiene rubber=8:2), in which, in the preparation thereof, styrene-butadiene rubber and butadiene rubber were mixed, but in mixture ratios outside the range specified in the present invention, had increased amounts of unreacted residual monomers, and the rubber particles in the modified ABS resins that were ultimately prepared had excessively enlarged or reduced average particle diameters, and consequently, had significantly degraded impact strengths.

Moreover, compared to the modified ABS resin in Example 1, the modified ABS resin (4.2 wt %) in Comparative Example 5, in which the content of n-phenyl maleimide in the prepared resin was below the minimum content range specified in the present invention, had an increase in unreacted residual monomers and at least a two times increase in total volatile organic compounds (TVOC). Furthermore, compared to the modified ABS resin in Example 7, the modified ABS resin (11.3 wt %) in Comparative Example 6, in which the content of n-phenyl maleimide in the prepared resin was above the maximum content range specified in the present invention, had rubber particles having excessively increased average particle diameters in the modified ABS resin that was ultimately prepared, and consequently, had significantly degraded impact strength and tensile strength.

In addition, compared to the modified ABS resin in Example 3 (retention time: 1.7 hours), the modified ABS resin in Comparative Example 7, in which, in the preparation thereof, the polymerization solution was introduced into the first polymerization reactor at a flow rate of 16 kg/hr to control the retention time in the first polymerization reactor to be 1.4 hours, had about a 1.3 times increase in residual monomers and about a 1.7 times increase in total volatile organic compounds (TVOC). Conversely, compared to the modified ABS resin in Example 2 (retention time: 2.3 hours), the modified ABS resin in Comparative Example 8, in which, in the preparation thereof, the polymerization solution was introduced into the first polymerization reactor at a flow rate of 8 kg/hr to control the retention time in the first polymerization reactor to be 2.9 hours, had respective continuous phases having measured weight-average molecular weights below the intended numerical ranges, and consequently, had an impact strength that was 60% of the modified ABS resin in Example 2.

Moreover, compared to the modified ABS resin in Example 1, the modified ABS resins in Comparative Example 9 (devolatilization tank temperature above 250° C.), Comparative Example 10 (devolatilization tank temperature below 230° C.), and Comparative Example 11 (devolatilization tank pressure above 30 torr), in which, in the preparation thereof, the devolatilization tank conditions deviated from those specified in an embodiment of the present invention, had at most a 1.6 times increase in residual monomers, and had at most a 258% increase in total volatile organic compounds (TVOC) (Comparative Examples 10 and 11) or an impact strength that was decreased to 62% (Comparative Example 9).

In addition, compared to the modified ABS resin in Example 1, the modified ABS resin in Comparative Example 12, in which, in the preparation thereof, the n-phenyl maleimide compound is not dissolved in the polymerization solution and introduced into the polymerization reactor at the same time as the other components, but instead is introduced into the first polymerization reactor in a separate step, had a continuous phase having a measured weight-average molecular weight significantly outside of the intended numerical range and rubber particles having an excessively enlarged average particle diameter, and consequently, had significantly degraded impact strength and tensile strength.

As shown by the results above, a preparation method according to an embodiment of the present invention may control weight-average molecular weight and the average particle diameter of rubber particles while preparing a modified ABS resin having a low total volatile organic compounds content. Moreover, the modified ABS resin may not only have an excellent balance of impact resistance, processability, and heat resistance, but may also be environmentally friendly.

The invention claimed is:

1. A method for preparing a modified acrylonitrile-butadiene-styrene resin, the method comprising:
   1) a step for preparing a polymerization solution by introducing and thereby dissolving a rubbery polymer and an N-sumstituted maleimide compound into a mixed solution that includes a reaction solvent, an aromatic vinyl monomer, and an ethylenically unsaturated nitrile monomer;
   2) a step for preparing a polymerization product by polymerizing the polymerization solution; and
   3) a step for devolatilizing the polymerization product,
   wherein the rubbery polymer includes a butadiene rubber and a styrene-butadiene rubber,
   wherein the polymerization solution includes 10 to 30 wt % of the reaction solvent, 35.5 to 70.5 wt % of the aromatic vinyl monomer, 12 to 15 wt % of the ethylenically unsaturated nitrile monomer, 5 to 15 wt % of the rubbery polymer, and 2.5 to 6 wt % of the N-substituted maleimide compound.

2. The method of claim 1, wherein the rubbery polymer in step 1) includes the butadiene rubber and the styrene-butadiene rubber in a weight ratio of 3:7 to 5:5.

3. The method of claim 1, wherein the rubbery polymer has a viscosity of at most 50 cp as measured by a Brookfield DV viscometer with a #3 spindle moving at 10 rotations per minute through a solution in which the rubbery polymer is dissolved at a 5% concentration in styrene.

4. The method of claim 1, wherein the polymerization reaction in step 2) is carried out via continuous bulk polymerization including at least one polymerization step.

5. The method of claim 1, wherein:
   the polymerization reaction in step 2) is carried out via continuous bulk polymerization including a first polymerization step, a second polymerization step, a third polymerization step, and a fourth polymerization step; and
   the polymerization temperature increases going from the first polymerization step to the fourth polymerization step.

6. The method of claim 5, wherein the first polymerization step is continuous bulk polymerization carried out at a temperature range of 100 to 120° C. for 1.5 to 2.5 hours.

7. The method of claim 5, wherein the second polymerization step is continuous bulk polymerization carried out at a temperature range of 125 to 140° C.

8. The method of claim 5, wherein the third polymerization step is continuous bulk polymerization carried out at a temperature range of 140 to 150° C.

9. The method of claim 5, wherein the fourth polymerization step is continuous bulk polymerization carried out at a temperature range of 150 to 160° C.

10. The method of claim 5, wherein, in the second polymerization step, a supplemental solution including, with respect to 100 parts by weight of the polymerization solution, 10 to 25 parts by weight of a reaction solvent and 0.02 to 0.04 parts by weight of a molecular weight control agent is added and thereby made to participate in the polymerization reaction.

11. The method of claim 5, wherein after the first polymerization step, the weight-average molecular weight (Mw) of a continuous phase is 250,000 to 300,000 g/mol, the continuous phase being a copolymer of the aromatic vinyl monomer, the ethylenically unsaturated nitrile monomer, and the substituted maleimide compound.

12. The method of claim 1, wherein the devolatilization in step 3) is carried out at a temperature range of 230 to 250° C. and under a pressure condition of 30 torr or below.

13. A modified acrylonitrile-butadiene-styrene resin prepared according to the preparation method in claim 1, the modified acrylonitrile-butadiene-styrene resin comprising:
   a dispersed phase, which is a rubber particle derived from a rubbery polymer including a butadiene rubber and a styrene-butadiene rubber; and
   a continuous phase, which is a terpolymer derived from an aromatic vinyl monomer, an ethylenically unsaturated nitrile monomer, and an N substituted maleimide compound, wherein the weight-average molecular weight (Mw) of the continuous phase is 150,000 to 180,000 g/mol.

14. The modified acrylonitrile-butadiene-styrene resin of claim 13, wherein the weight ratio between the dispersed phase and the continuous phase is 8:92 to 25:75.

15. The modified acrylonitrile-butadiene-styrene resin of claim 13, wherein the average particle diameter of the dispersed phase is 1.0 to 2.0 µm.

16. The modified acrylonitrile-butadiene-styrene resin of claim 13, wherein at least a portion of the continuous phase is grafted or adsorbed on the external surface of the dispersed phase.

17. The modified acrylonitrile-butadiene-styrene resin of claim 13, wherein the continuous phase includes 5 to 10 wt % of an N substituted maleimide compound-derived unit.

18. The modified acrylonitrile-butadiene-styrene resin of claim 13, wherein the resin has a total volatile organic compounds (TVOC) content of 40 µg C/g or less.

* * * * *